(12) United States Patent
Soerensen

(10) Patent No.: US 11,378,064 B2
(45) Date of Patent: Jul. 5, 2022

(54) BRUSH ARRANGEMENT

(71) Applicant: Siemens Gamesa Renewable Energy A/S, Brande (DK)

(72) Inventor: Soeren Kammer Soerensen, Horsens (DK)

(73) Assignee: SIEMENS GAMESA RENEWABLE ENERGY A/S

(*) Notice: Subject to any disclaimer, the term of this patent is extended or adjusted under 35 U.S.C. 154(b) by 525 days.

(21) Appl. No.: 16/479,059

(22) PCT Filed: Nov. 9, 2017

(86) PCT No.: PCT/EP2017/078681
§ 371 (c)(1),
(2) Date: Jul. 18, 2019

(87) PCT Pub. No.: WO2018/137804
PCT Pub. Date: Aug. 2, 2018

(65) Prior Publication Data
US 2019/0368471 A1    Dec. 5, 2019

(30) Foreign Application Priority Data

Jan. 24, 2017   (DE) ................... 10 2017 201 107.6

(51) Int. Cl.
*F03D 80/30*   (2016.01)
*H02K 11/40*   (2016.01)
(Continued)

(52) U.S. Cl.
CPC ........... *F03D 80/30* (2016.05); *H01R 39/383* (2013.01); *H01R 39/64* (2013.01); *H01R 43/14* (2013.01);
(Continued)

(58) Field of Classification Search
CPC ......... F03D 80/30; H01R 39/20; H01R 39/26; H01R 39/38; H01R 39/383; H01R 39/385;
(Continued)

(56) References Cited

U.S. PATENT DOCUMENTS

| | | | |
|---|---|---|---|
| 10,612,525 B2* | 4/2020 | Huang | F03D 80/30 |
| 2011/0305573 A1* | 12/2011 | Olsen | F03D 80/30 |
| | | | 416/146 R |
| 2015/0042203 A1* | 2/2015 | Osborne | H02K 9/06 |
| | | | 310/239 |

FOREIGN PATENT DOCUMENTS

| | | | | |
|---|---|---|---|---|
| CA | 2783511 A1 * | 6/2011 | ............ | F03D 80/30 |
| CN | 102278286 A | 12/2011 | | |

(Continued)

OTHER PUBLICATIONS

Non-English Chinese Office Action for Application No. 201780084547.6, dated May 21, 2020.
(Continued)

*Primary Examiner* — Naishadh N Desai
(74) *Attorney, Agent, or Firm* — Schmeiser, Olsen & Watts LLP

(57) ABSTRACT

Provided is a brush arrangement of a wind turbine lightning protection system, realized to provide a current path from a hub to a canopy of the wind turbine, which brush arrangement includes a brush holder arranged to hold a brush in electrical contact with a contact surface at the exterior of the canopy, which contact surface is electrically connected to the hub; a bracket arranged to electrically connect the brush with a mounting plate; characterized by an access opening in the front wall of the canopy, which access opening is dimensioned to accommodate the bracket and brush holder; and a mounting arrangement for securing the mounting plate to the canopy front wall over the access opening, from (Continued)

within the canopy interior. A wind turbine including a lightning protection system with at least one such brush arrangement is also provided.

9 Claims, 4 Drawing Sheets

(51) Int. Cl.
    *H01R 39/38*     (2006.01)
    *H01R 39/64*     (2006.01)
    *H01R 43/14*     (2006.01)
    *H02K 7/18*     (2006.01)
    *H02K 5/14*     (2006.01)
    *H01R 39/20*     (2006.01)
    *H01R 39/26*     (2006.01)

(52) U.S. Cl.
    CPC .............. *H02K 5/14* (2013.01); *H02K 7/1838* (2013.01); *H02K 11/40* (2016.01); *H01R 39/20* (2013.01); *H01R 39/26* (2013.01); *H01R 39/385* (2013.01)

(58) Field of Classification Search
    CPC ........ H01R 39/64; H01R 43/14; H02K 11/40; H02K 7/1838; H02K 5/14; Y02E 10/72
    See application file for complete search history.

(56) References Cited

FOREIGN PATENT DOCUMENTS

| | | | |
|---|---|---|---|
| CN | 103352808 | A | 10/2013 |
| CN | 103603775 | A | 2/2014 |
| DE | 102004010104 | A1 | 9/2005 |
| EP | 1154537 | A2 | 11/2001 |
| EP | 2110552 | B1 | 10/2009 |
| JP | H0560053 | A | 3/1993 |
| WO | 2005050008 | A1 | 6/2005 |
| WO | 2011131205 | A1 | 10/2011 |
| WO | WO-2011131205 | A1 * | 10/2011 ............. F03D 80/30 |
| WO | 2013091380 | A1 | 6/2013 |
| WO | WO-2018153520 | A1 * | 8/2018 ............. F03D 80/30 |

OTHER PUBLICATIONS

International Search Report dated Mar. 12, 2018 for Application No. PCT/EP2017/078681.

* cited by examiner

BRUSH ARRANGEMENT

CROSS-REFERENCE TO RELATED APPLICATIONS

This application claims priority to PCT Application No. PCT/EP2017/078681, having a filing date of Nov. 9, 2017, which is based off of DE Application No. 10 2017 201 107.6, having a filing date of Jan. 24, 2017, the entire contents both of which are hereby incorporated by reference.

FIELD OF TECHNOLOGY

The following describes a brush arrangement of a wind turbine lightning protection system; a wind turbine; and a method of performing a maintenance procedure on such a brush arrangement.

BACKGROUND

A wind turbine is vulnerable to lightning strikes on account of its construction, and also on account of its generally isolated position. A wind turbine can be hit many times, and therefore generally comprises a lightning protection system (LPS) to safely divert the very large lightning currents to ground. A lightning strike can hit a wind turbine at any point, typically at the rotor blades, since these are the most exposed parts. Since the hub is connected to a main shaft or low-speed shaft of the generator assembly, it is important to design the wind turbine LPS to ensure that lightning current is diverted to ground and does not damage the generator. It is relatively straightforward to provide an electrical connection from the canopy to a bedframe (which supports the generator assembly), and then via down conductors through the tower to ground. However, a lightning strike to a rotor blade must be prevented from passing from the hub to the main shaft, and must be diverted to the canopy (from where it can pass to the bedframe). A wind turbine LPS will therefore generally comprise a down conductor in each blade, continuing through to the hub and via one or more brushes through to the canopy and bedframe, and then via further down conductors through the tower to ground. The brush interface should always provide a path of least resistance from the hub to the canopy and bedframe.

The uninterrupted electrical path is generally achieved by using one or more spring-loaded graphite "brushes". This is the case for the hub-to-bedframe current path of a wind turbine LPS. A brush assembly can be secured to the stationary part (e.g. the canopy) so that the brush is continually pressed against the rotatable part (a suitable surface of the rotating hub or the low-speed shaft to which the hub is connected). A brush will eventually wear down, and must be replaced. In the existing designs, a bracket for holding the brush is mounted onto the outside front wall of the canopy. This arrangement requires a technician to enter the narrow and confined space in the spinner at the front of the wind turbine in order to install the brush and bracket, and again later on, in order to perform any maintenance steps.

The health and safety risks associated with such a manoeuvre are considerable, and it is necessary to ensure that the risk is minimized. For example, a technician must wear a harness when working in the spinner. Furthermore, the limited space and the cramped environment means that the technician can only move slowly and may have to crawl in order to reach the LPS bracket on the canopy front wall.

These aspects all add to the overall costs associated with the known bracket/brush solutions in the hub-to-canopy current path.

SUMMARY

An aspect relates to provide a brush arrangement for which installation and maintenance are easier and less costly.

According to embodiments of the invention, the brush arrangement of a wind turbine lightning protection system is realized to provide a current path from a hub to the canopy of the wind turbine, and comprises a brush holder arranged to hold a brush in electrical contact with a rotating contact surface at the exterior of the canopy, which contact surface is electrically connected to the hub; and a bracket arranged to electrically and physically connect the brush with a mounting plate, which is secured to the stationary canopy. The inventive brush arrangement is characterized by an access opening in the front wall of the canopy, which access opening is dimensioned to accommodate the bracket and brush holder; and by a mounting arrangement for securing the mounting plate to the canopy front wall—from within the canopy interior—over the access opening.

An advantage of the inventive brush arrangement according to embodiments of the invention is that it allows the quick and straightforward installation, inspection and replacement of a brush of an LPS bracket. Any such manoeuvre can be easily and quickly be carried out from within the canopy interior, which is significantly safer and roomier than the spinner, so that the risks and costs associated with such a manoeuvre can be favourably reduced. In the following, it may be assumed that the "brush arrangement" or "brush assembly" is an element of the hub-to-canopy current path that electrically connects the blades and hub to electrical ground via the canopy and bedframe. Since the inventive brush arrangement can be regarded as a brush bracket of an LPS, the terms "brush arrangement" and "lightning brush bracket" are regarded as synonyms and may be used interchangeably.

The wind turbine comprises a generator assembly arranged within a canopy, with a low-speed shaft, a gearbox for speed and torque conversion, and a high-speed shaft connected to the generator. A front end of the low-speed shaft assembly extends to the exterior of the canopy for connection to the hub. According to embodiments of the invention, the wind turbine further comprises at least one brush arrangement of the type described above to provide a current path from the hub through the brush and then through the canopy, bedframe and then through the tower to electrical ground.

According to embodiments of the invention, the method of performing a maintenance procedure on the brush of such a brush arrangement comprises the steps of dismounting the mounting plate from the canopy front wall from within the canopy interior to expose the access opening; drawing the bracket and brush holder through the access opening; inspecting and/or replacing the brush of the brush arrangement; inserting the bracket and brush holder through the access opening; and then once again, from within the canopy interior, securing the mounting plate to the canopy front wall over the access opening.

An advantage of the inventive method is that the inspection and possible replacement of a brush of an LPS bracket can easily and quickly be carried out. There is no longer any need for a technician to enter the spinner for this purpose, and the technician is no longer exposed to the health and safety risks associated with entering into and moving about in the confined space of the spinner. Instead, the design of the inventive brush arrangement allows the technician to easily retrieve the brush bracket from within the interior of the canopy.

In the following, it may be assumed that the rotor hub of the wind turbine is rotatably joined to the low-speed shaft that extends to a gearbox, which performs speed and torque conversion of a high-speed shaft that is connected to the generator. The canopy or nacelle serves to shield these and various other components from the environment, and the terms "canopy" and "nacelle" may be used interchangeably.

The contact surface can be any surface of the rotating part of the wind turbine. For example, the contact surface could be a surface of the hub. In the following, without restricting embodiments of the invention in any way, it may be assumed that the contact surface is a surface of the front end of the main shaft that protrudes to the exterior of the canopy at the canopy front end, since this contact surface is closer to the canopy than the hub, allowing a more compact realization of a brush assembly.

A wind turbine can comprise at least one of the inventive brush arrangements. However, a wind turbine comprises several such brush arrangements arranged essentially equidistantly about the hub/shaft interface. For example, three or four lightning brush brackets, spaced at equal intervals around the contact surface, can ensure that the electrical current is quickly and safely diverted to ground in the event of a lightning strike to the canopy. Using several such lightning brush brackets ensures a safe path to ground even if one or more of the brushes is worn and in need of replacement.

As indicated above, a brush is held in a brush holder, which in turn is mounted to the bracket. The brush holder is constructed to continually exert a force on the brush, thereby pressing the brush against the contact surface. The brush is effectively spring-loaded. The brush holder, any spring-loading mechanism, and a connector wire are generally supplied as a single unit, and can be mounted to any appropriate holder by means of the connector wire. The brush is generally constructed to carry large currents, and its connector wire will have a correspondingly large diameter or cross-sectional area. In an exemplary embodiment of the invention, the bracket comprises a connector assembly adapted to electrically connect the brush to the bracket by means of the connector wire. For example, the connector wire can terminate in an O-shaped or C-shaped tab in order to engage with a bolt. For such a brush holder, the connector assembly of the inventive lightning brush bracket is realized to clamp the tab (mounted at the end of the connector wire) between the bracket and a fastener. There are various types of brush assembly for installation in any number of LPS applications, and a bracket may generally need to be manufactured to suit a specific kind of brush assembly chosen for a specific LPS application. The bracket is essentially an interface between the brush assembly and the LPS in which it will be used. To avoid unnecessary costs, in a particularly exemplary embodiment of the invention, the bracket comprises an elongate slit that extends away from the brush holder and is arranged to accommodate various connecting wire lengths (and therefore various types of brush holder assembly). The elongate slit is shaped to accommodate a fastener for clamping the tab to the bracket. When a brush assembly is being installed, the technician can manoeuvre the tab of its connector wire between the bracket and the fastener to adjust the slack of the connector wire.

The inventive brush assembly—i.e. the bracket, the brush holder and the mounting plate—can easily by manoeuvred by a technician to either move the bracket and brush holder through the access opening and onto the other side of the canopy front wall, or to pull the bracket and brush holder through the access opening and into the canopy. The access opening need only be large enough to comfortably accommodate the bracket and the brush holder of the brush assembly. The dimensions of the brush assembly will therefore be determined largely by the size of the brush holder. The bracket and the mounting plate are constructed so that, when the brush makes contact with the desired contact surface, the mounting plate lies against the inside surface of the canopy front wall. The bracket can have any shape that suitably joins the vertically oriented mounting plate and the brush holder. For example, a lightning brush bracket may be designed to press its brush against the cylindrical outside surface of the main shaft (protruding through the front wall of the canopy). The plane of the canopy wall may therefore be regarded as being orthogonal to a plane of the electrical contact between brush and main shaft, and the bracket can be shaped appropriately to achieve the desired orientation of the brush. A curved bracket can achieve the desired connection, and its curved shape can facilitate ease of passage through the access opening, as will be explained with the aid of the diagrams.

The mounting plate completely covers the access opening, so that contaminants such as grease, dirt, and moisture can be prevented from passing between the spinner interior and the canopy interior. In a particularly straightforward realisation, the access opening and the mounting plate each have a simple shape, for example circular or square, whereby the mounting plate is larger than the access opening to accommodate a suitable number of fasteners. For example, a rectangular mounting plate can be secured to the canopy front wall by four bolts, with one bolt in each of the four corners, to engage with a complementary arrangement of weld nuts or blind rivet nuts previously fastened to the canopy front wall.

BRIEF DESCRIPTION

Some of the embodiments will be described in detail, with reference to the following figures, wherein like designations denote like members, wherein.

In the diagrams, like numbers refer to like objects throughout. Objects in the diagrams are not necessarily drawn to scale.

DETAILED DESCRIPTION

Figure 1:
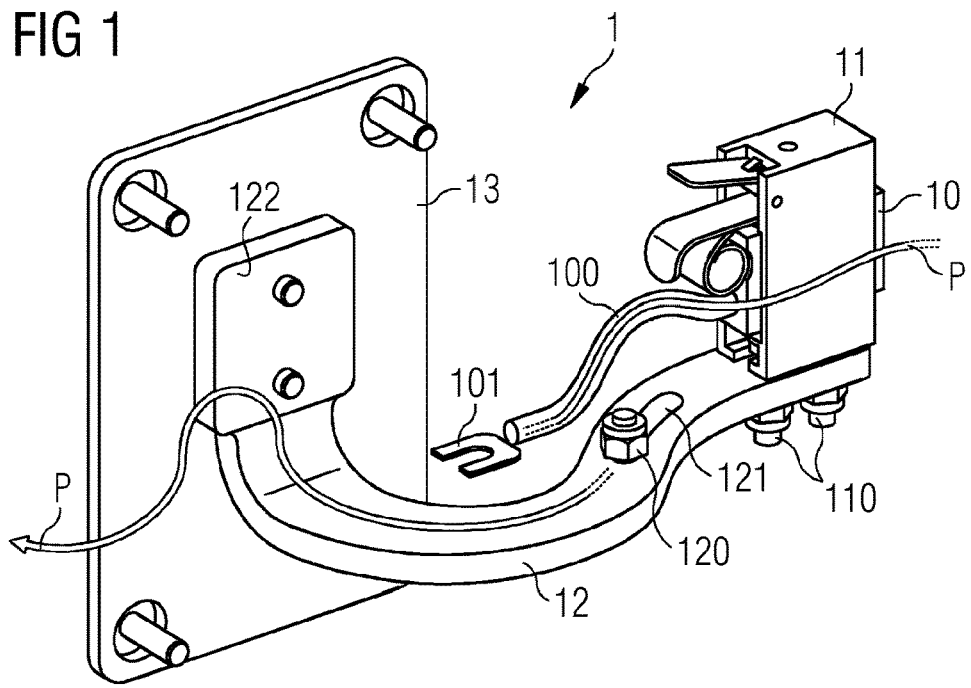
FIG. 1 shows a first view of an embodiment of the inventive brush arrangement.

FIG. 1 shows a first view of an embodiment of the inventive brush arrangement 1. The diagram shows a curved bracket 12 connecting a flat mounting plate 13 and a brush holder 11. The brush holder 11 is secured to the bracket 12 by means of bolts 110 as shown, and is shaped to hold a carbon or graphite brush 10 in a spring-loaded manner. A brush assembly comprising brush 10, connector wire 100, a spring-loading mechanism and a snap-fit element can be inserted into the brush holder 11, so that the entire assembly is securely contained and so that the brush 10 will be pushed against a contact surface for the duration of its useful lifetime. A tab 101 at the end of the connector wire 100 can be clamped between the bracket 12 and a fastener 120 to make a robust electrical connection between brush 10 and bracket 12. The bracket 12 has an elongate opening 121 to accommodate various lengths of connector wire 100, so that the bracket 12 can be used together with different types of brush assembly. The fastener 120 can be tightened to ensure a good electrical connection between the tab 101 and the bracket 12. All relevant components e.g. connector wire 100, tab 101, bracket 12 and mounting plate 13—are made of an electrically conductive material such as stainless steel or copper.

Figure 2:
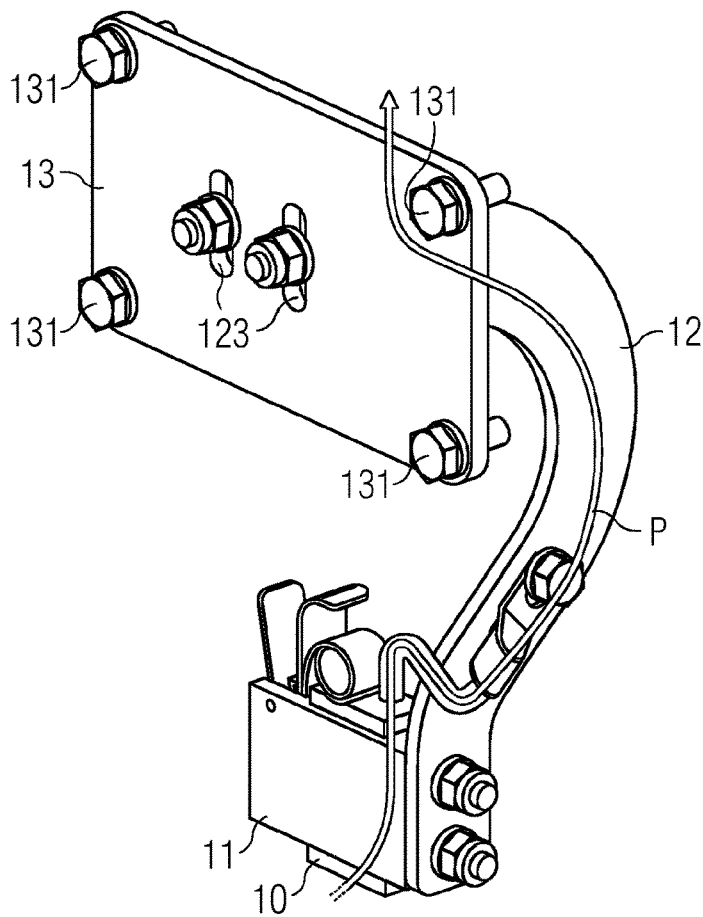
FIG. 2 shows a second view of the brush arrangement described in FIG. 1.
Figure 3:
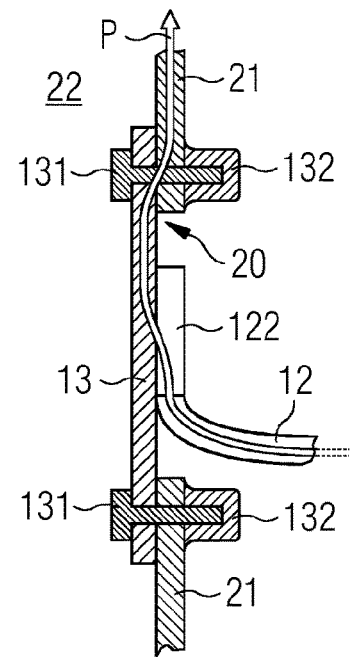
FIG. 3 shows a cross-section of the brush arrangement described in FIG. 1 after installation.

FIG. 2 shows another view of the inventive brush arrangement 1, and shows the tab 101 at the end of the connector wire 100 clamped between the bracket 12 and a fastener 120 to make a robust electrical connection between brush 10 and bracket 12. While the bracket 12 could be formed in one piece with the mounting plate 13, in this exemplary embodiment the bracket 12 is bolted to the mounting plate 13 using fasteners 121, and through-holes in the mounting plate 13 allow some positional adjustment of the bracket 12 to compensate for any tolerance between main shaft and canopy front. The bolts 123 are chosen to ensure a robust electrical connection between the bracket 12 and the mounting plate 13. The diagram shows part of the hub-to-canopy current path P which electrical current will follow in the event of a lightning strike to a blade or to the hub. In the cross-section view of FIG. 3, it can be seen that the access opening 20 is smaller than the mounting plate 13, and the diagram also shows fixed nuts 132 such as weld nuts or blind rivets that have been permanently secured to the outside of the canopy front wall 21. To install the brush assembly 1, the bracket 12 and brush holder 11 etc. are inserted through the access opening 20, until the mounting plate 13 lies against the inside surface of the canopy front wall 21. Bolts 131 are then inserted through matching and aligned through-holes or bushings in the mounting plate 13 and the canopy front wall 21, and tightened to secure the mounting plate 13 to the canopy front wall 21.

Figure 4:
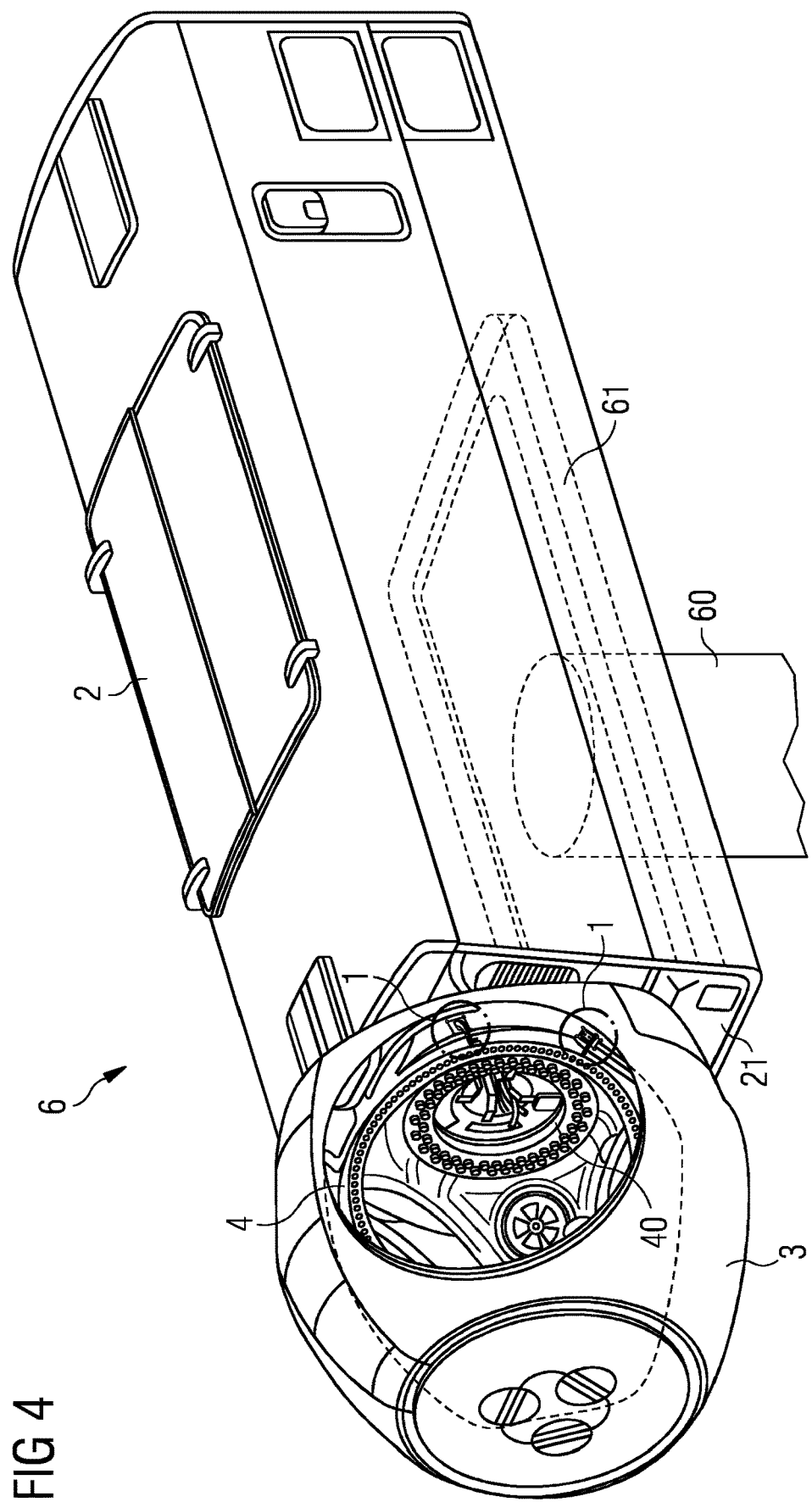
FIG. 4 shows a number of inventive brush arrangements installed between a canopy and a generator main shaft.

FIG. 4 shows a spinner 3 mounted over a hub 4 at the front of a canopy 2 of a wind turbine 6. The drawing does not show the blades (which would be mounted to the hub through openings in the spinner) or the generator assembly but these may be assumed. The canopy 2 is mounted on top of a tower 60 via a yaw ring. The generator assembly is supported by a bedframe 61. The wind turbine may be assumed to comprise an LPS in which the canopy 2 is electrically connected to the bedframe 61, which in urn is connected to earth via down conductors through the tower 60. The LPS may further be assumed to comprise down conductors for the blades, in electrical contact to the hub 4. The hub 4 is mounted to the low-speed shaft 5 of the generator assembly by means of an annular arrangement of bolts securing a bolt ring 40 of the hub to the annular front end of the low-speed shaft 5, so that when wind causes the rotor blades to rotate, the hub 4 and generator main shaft 5 rotate accordingly. This diagram clearly indicates the very limited space available in the spinner 3, and gives an idea of the difficulty experienced by a technician whose task would be to perform a repair or maintenance task in that confined and hazardous space.

Figure 5:
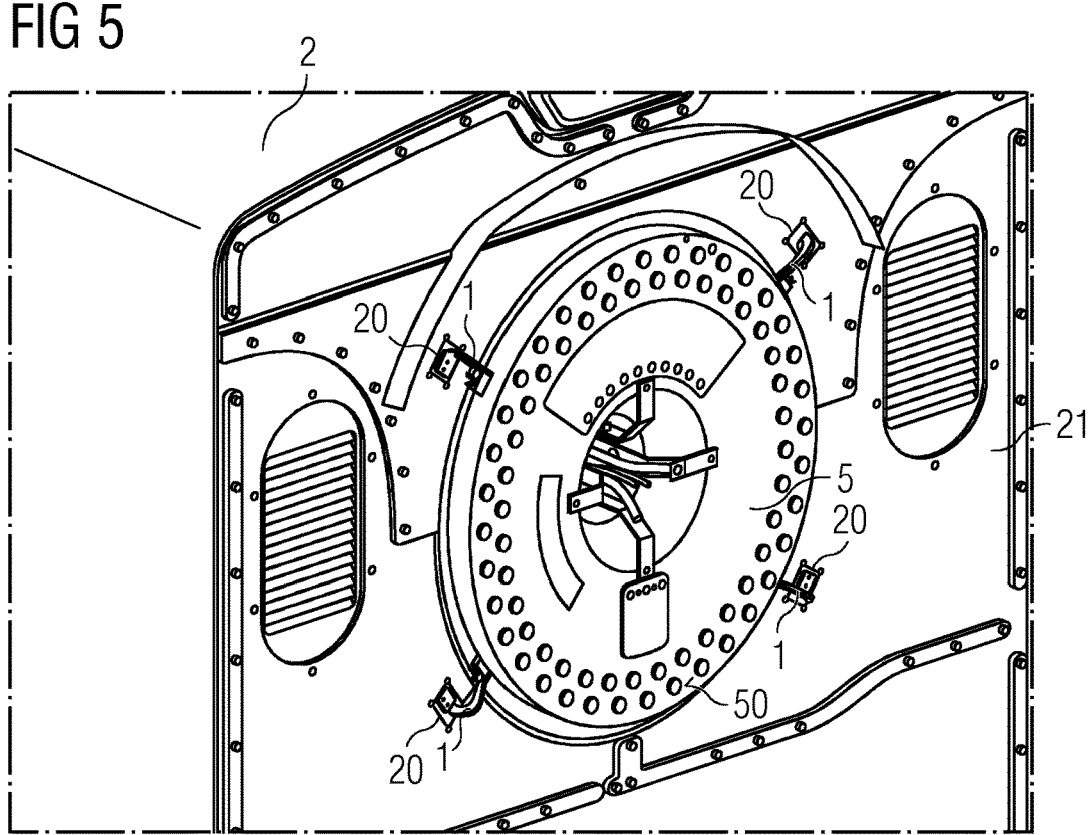
FIG. 5 shows a further view of the embodiment of FIG. 4.

The diagram indicates the position of two brush assemblies 1 electrically connecting the canopy 2 to the main shaft 5 of the generator. FIG. 5 shows a simplified view with fewer components, and clearly indicates the front end of the generator main shaft 5, and the contact surface 50 against which the brushes 10 of the lightning brush brackets 1 are pressed. The diagram also indicates access openings 20 formed in the front wall of the canopy 2, so that the lightning brush brackets 1 can be installed and maintained from the interior 22 of the canopy 2, thus avoiding any of the difficulties and risks associated with entering the spinner. The diagram also shows that such a wind turbine can easily be retro-fitted with lightning brush brackets 1 according to embodiments of the invention, since the only modification would be to form access openings 20 in the canopy, and to detach and remove any existing brush assemblies of the conventional type.

Figure 6:
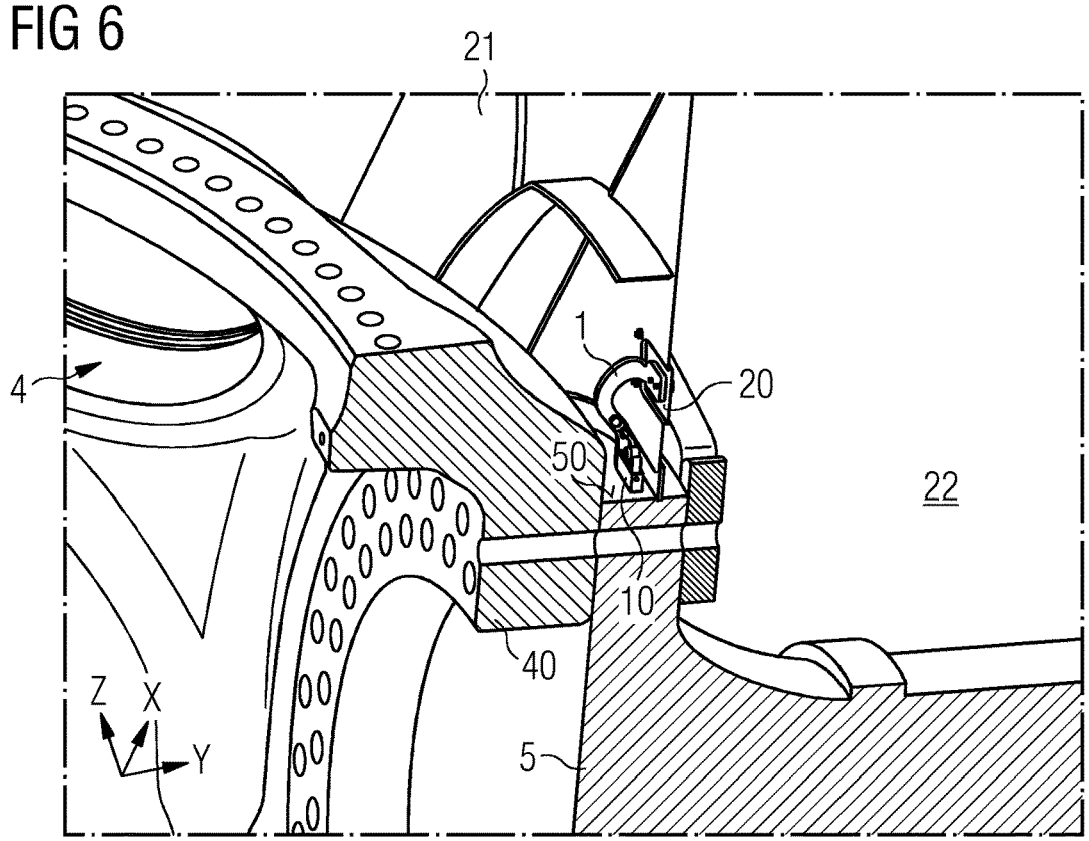
FIG. 6 shows a detail of the embodiment of FIG. 4.

FIG. 6 shows a more detailed view of the embodiment of FIGS. 4 and 5. Here, the diagram shows the electrical connection between a brush 10 and a surface 50 of the low-speed shaft 5. The diagram also indicates the annular connection between the low-speed shaft 5 and a bolt ring 40 of the hub 4. The diagram allows the advantage of a curved bracket shape to be appreciated: when installing or removing the brush arrangement 1, the curved bracket shape allows the brush holder 11 to be manoeuvred in the confined space between hub ring 40 and canopy front wall 21 without being knocked or pressed against any surface, which might otherwise cause damage to the brush 10. Of course, space permitting, other more straightforward bracket shapes would be conceivable.

Figure 7:
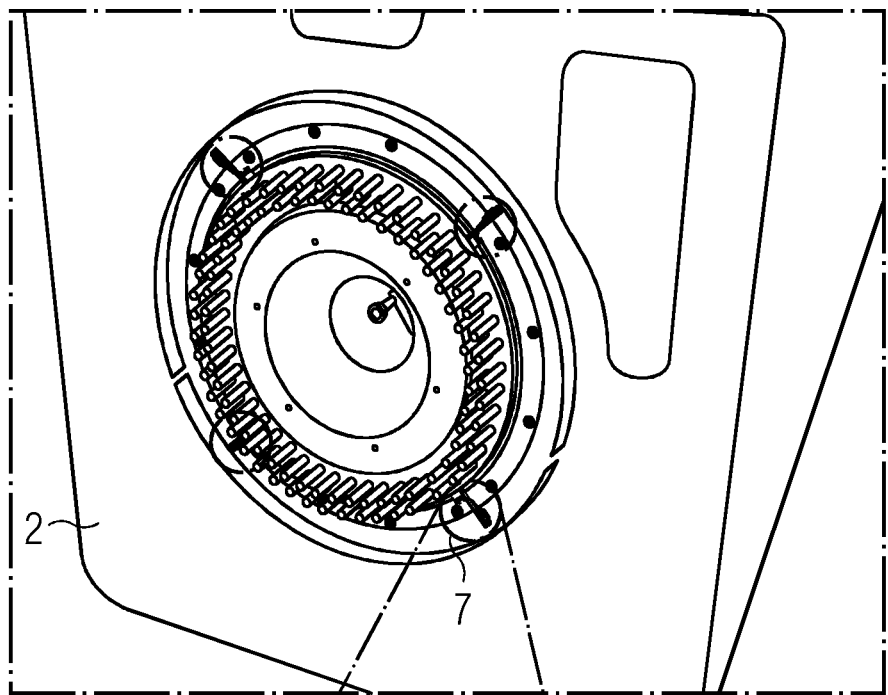
FIG. 7 shows a known brush arrangement.
Figure 8:
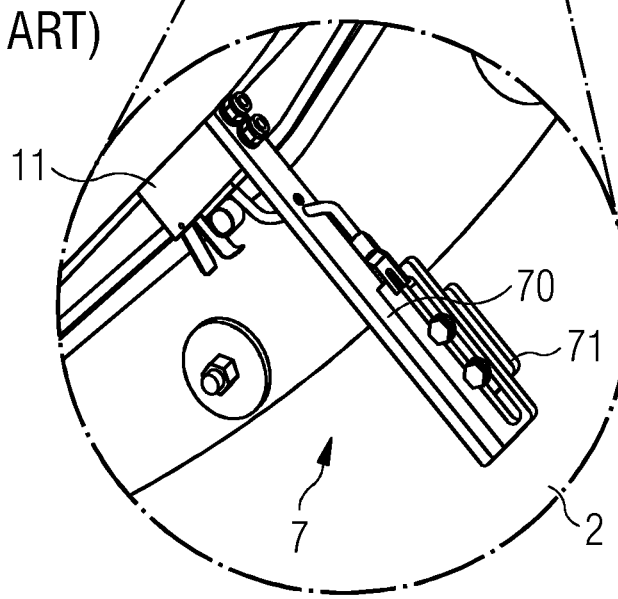
FIG. 8 shows a detail of the brush arrangement of FIG. 7.

FIG. 7 shows a known arrangement, in which brush assemblies 7 are mounted onto the front wall of the canopy 2. A detail is shown in FIG. 8, clearly showing the type of bracket 70 used in the conventional approach. This requires a matching mounting fitting 71 to be fastened to the canopy front wall 21. To install this prior art brush assembly, or to perform a maintenance step, the skilled person must enter the confined space between spinner and hub, with all the attendant risks and difficulties.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A brush arrangement of a wind turbine lightning protection system, realized to provide a current path from a hub to a canopy of the wind turbine, which brush arrangement comprises:
  a brush holder arranged to hold a brush in electrical contact with a contact surface at an exterior of the canopy, which contact surface is electrically connected to the hub;
  a bracket arranged to electrically connect the brush with a mounting plate; wherein
  an access opening in a front wall of the canopy, which access opening is dimensioned to accommodate the bracket and the brush holder; and a mounting arrangement for securing the mounting plate to the canopy front wall over the access opening, from within a canopy interior.

2. The brush arrangement according to claim 1, wherein the bracket comprises a connector assembly adapted to electrically connect the brush to the bracket.

3. The brush arrangement according to claim 1, wherein the connector assembly is realized to clamp a brush connector wire tab between the bracket and a fastener.

4. The brush arrangement according to claim 3, wherein the connector assembly comprises an elongate slit arranged to accommodate the fastener.

5. The brush arrangement according to claim 1, wherein the surface area of the mounting plate is larger than the access opening.

6. The brush arrangement according to claim 1, comprising an arrangement of nuts mounted to the outside of the canopy front wall to accommodate a corresponding arrangement of bolts inserted through the mounting bracket and the canopy front wall.

7. A wind turbine comprising a generator assembly supported on a bedframe within a canopy, wherein a contact surface of a low-speed shaft of the generator assembly is located at the exterior of the canopy for connection to a hub, and further comprising a lightning protection system with at least one brush arrangement according to claim 1 to provide a current path from the hub to the canopy.

8. The wind turbine according to claim 7, comprising four brush arrangements according to claim 1 arranged essentially equidistantly about the contact surface.

9. A method of performing a maintenance procedure on a brush of the brush arrangement, which method comprises the steps of:
   dismounting a mounting plate from a canopy front wall from within a canopy interior to expose an access opening;
   drawing a bracket and a brush holder through the access opening;
   at least one of inspecting and replacing the brush of a brush arrangement;
   inserting the bracket and the brush holder through an access opening; and
   securing a mounting plate to the canopy front wall from within the canopy interior over the access opening.

* * * * *